United States Patent [19]
Hou

[11] Patent Number: 5,671,619
[45] Date of Patent: Sep. 30, 1997

[54] STEERING WHEEL LOCK

[76] Inventor: Jui-Hua Hou, No. 17-2, Chung-Jung Tsun, An-Ting Hsiang, Tainan Hsien, Taiwan

[21] Appl. No.: 728,526
[22] Filed: Oct. 9, 1996
[51] Int. Cl.⁶ ............................... B60R 25/02
[52] U.S. Cl. ...................... 70/209; 70/226; 340/425.5; 340/426
[58] Field of Search ............... 70/209, 211, 212, 70/225, 226, 237, 238; 180/287; 340/425.5, 426

[56] References Cited

U.S. PATENT DOCUMENTS

| | | | |
|---|---|---|---|
| 5,055,823 | 10/1991 | Fuller | 70/226 X |
| 5,426,960 | 6/1995 | Jan | 70/226 X |
| 5,440,908 | 8/1995 | Lin | 70/237 X |
| 5,452,597 | 9/1995 | Chen | 70/226 X |
| 5,595,077 | 1/1997 | Weng et al. | 70/226 X |
| 5,609,050 | 3/1997 | Yu | 70/209 |

Primary Examiner—Lloyd A. Gall

[57] ABSTRACT

A steering wheel lock including a casing equipped with a lock cylinder, a clamping plate pivoted to the casing and locked by the lock cylinder to secure the casing to the steering wheel of a car, a stop bar fixedly secured to the casing and stopped at the instrument board of the car, an alarm circuit assembly, a partition plate fastened to the casing on the inside to hold the alarm circuit assembly inside the casing, permitting a downward switching lever of the alarm circuit assembly to be pressed on the periphery of the steering wheel to alert the alarm circuit assembly.

1 Claim, 5 Drawing Sheets

STEERING WHEEL LOCK

BACKGROUND OF THE INVENTION

The present invention relates to steering wheel locks, and relates more particularly to such a steering wheel lock which fits the periphery of any of a variety of steering wheels and, which has a concealed alarm circuit assembly which produces an audio alarm signal when the steering wheel lock is destroyed by violence.

A variety of steering wheel locks with or without electronic alarm circuit means have been disclosed, and have appeared on the market. FIG. 1 shows a prior art steering wheel lock with electronic alarm circuit means. FIG. 2 shows a prior art steering wheel lock without electronic alarm circuit means. These two steering locks are commonly comprised of a lock body, and a detachable clamping plate adapted for securing the lock body to the steering wheel. Because the clamping plate is a separate member, it tends to be lost somewhere. While locking, the clamping plate cannot be quickly set into position, and several trials may be required. Still another drawback of these steering wheel locks is that they fit only one particular size of steering wheel. Furthermore, because the speaker of the steering wheel lock with electronic alarm circuit means of FIG. 1 is visible from the outside, the speaker can be easily blocked up or destroyed. FIGS. 3 and 4 show another structure of steering wheel lock according to the prior art. However, this structure of steering wheel lock cannot produce an alarm signal when destroyed by violence. Furthermore, this structure of steering wheel lock is inconvenient to be adjusted subject to the diameter of the periphery of the steering wheel to be locked.

SUMMARY OF THE INVENTION

The present invention has been accomplished to provide a steering wheel lock which eliminates the aforesaid problems. It is one object of the present invention to provide a steering wheel lock which is easy to operate. It is another object of the present invention to provide a steering wheel lock which fits any of a variety of steering wheels. It is another object of the present invention to provide a steering wheel lock which has an alarm circuit assembly concealed on the inside, which produces an audio alarm signal when the steering wheel lock is destroyed by violence.

According to one aspect of the present invention, the steering wheel lock comprises a casing equipped with a lock cylinder, a clamping plate pivoted to the casing and locked by the lock cylinder to secure the casing to the steering wheel of a car, a stop bar fixedly secured to the casing and stopped at the instrument board of the car, an alarm circuit assembly, a partition plate fastened to the casing on the inside to hold the alarm circuit assembly inside the casing, permitting a downward switching lever of the alarm circuit assembly to be pressed on the periphery of the steering wheel to alert the alarm circuit assembly. According to another aspect of the present invention, the clamping plate has a circular coupling block at one side pivoted to the casing, and locked by the lock cylinder of the casing, wherein the circular coupling block has transverse teeth spaced around the periphery for locking by the lock bolt of the lock cylinder at any of a series of positions subject to the diameter of the periphery of the steering wheel.

DETAILED DESCRIPTION OF THE PREFERRED EMBODIMENT

Figures 1, 2:
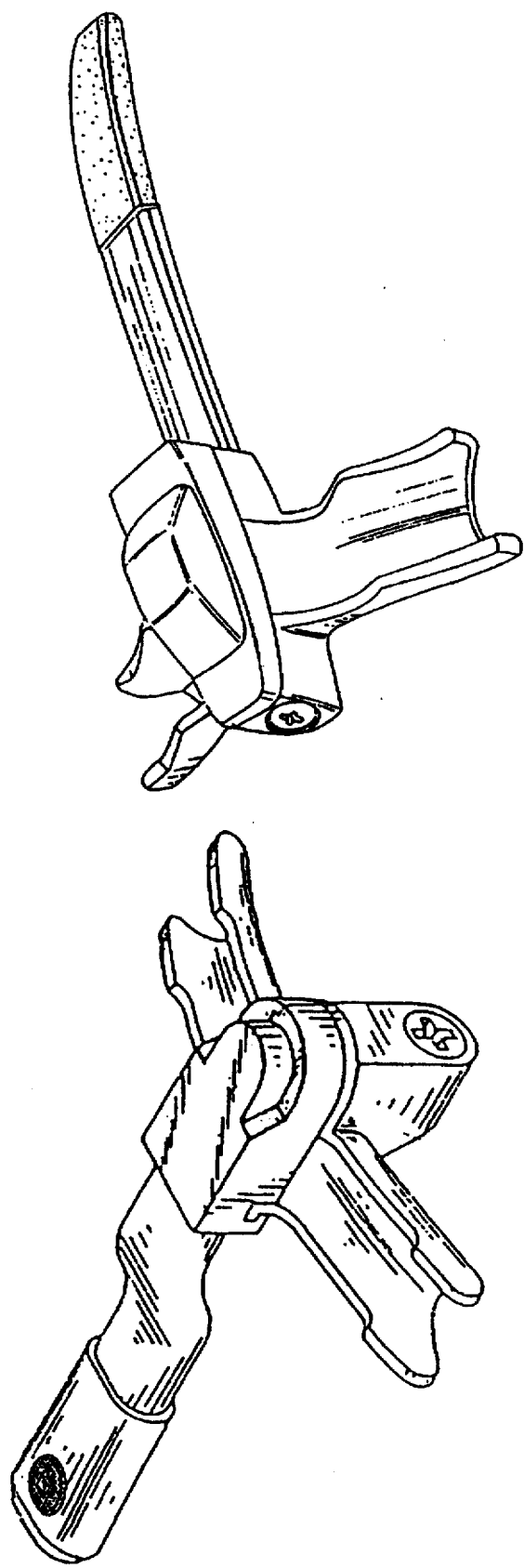
FIG. 1 is an elevational view of a steering wheel lock according to the prior art.
FIG. 2 is an elevational view of another structure of steering wheel lock according to the prior art.
Figure 4:
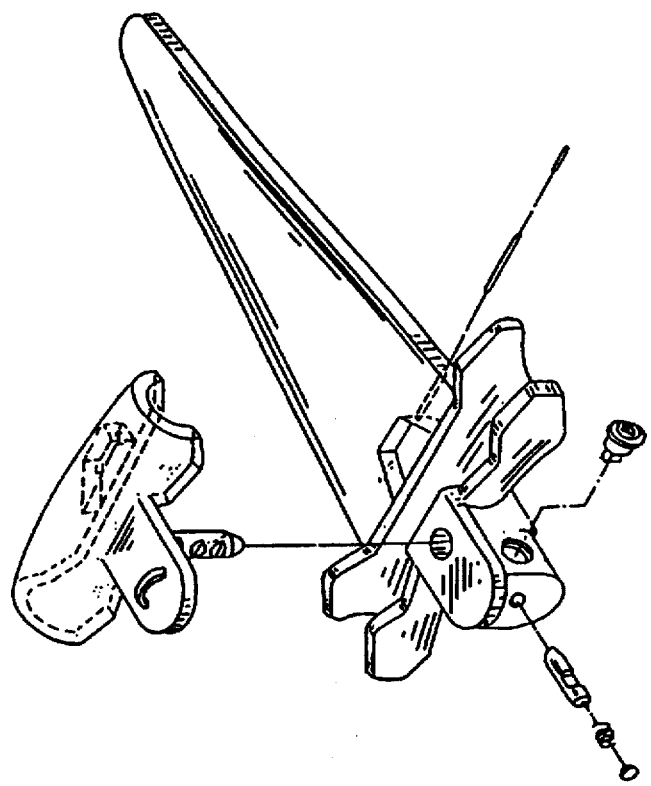
FIG. 4 is an exploded view of the steering wheel lock shown in FIG. 3.
Figure 3:
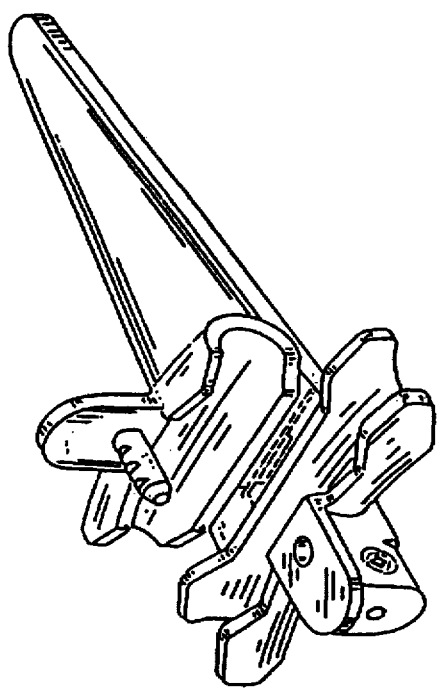
FIG. 3 is an elevational view of still another structure of steering wheel lock according to the prior art.
Figure 5:
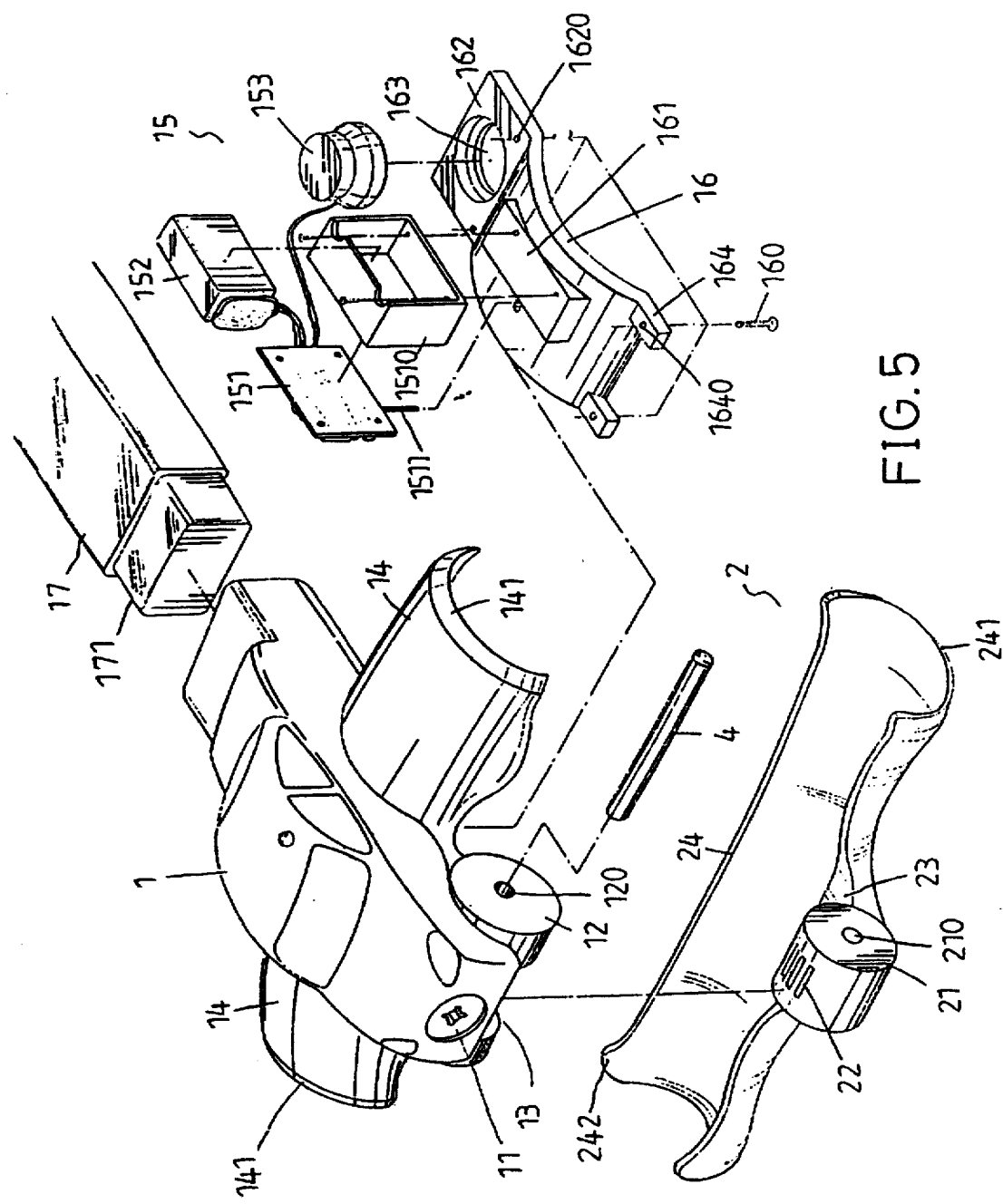
FIG. 5 is an exploded view of a steering wheel lock according to the present invention.
Figure 6:
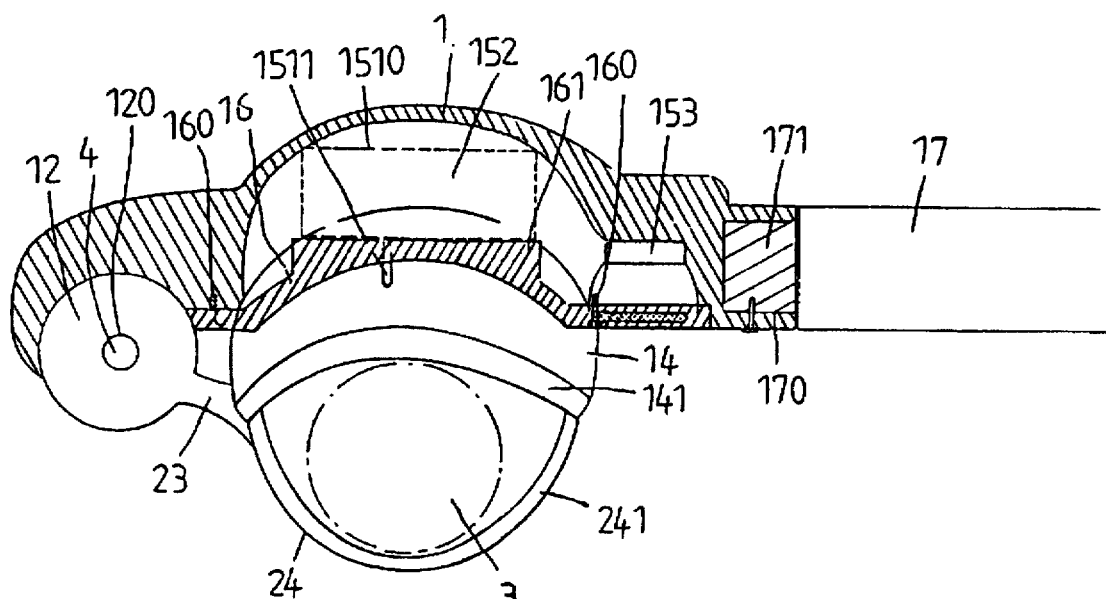
FIG. 6 is a sectional view of the steering wheel lock shown in FIG. 5.
Figure 7:
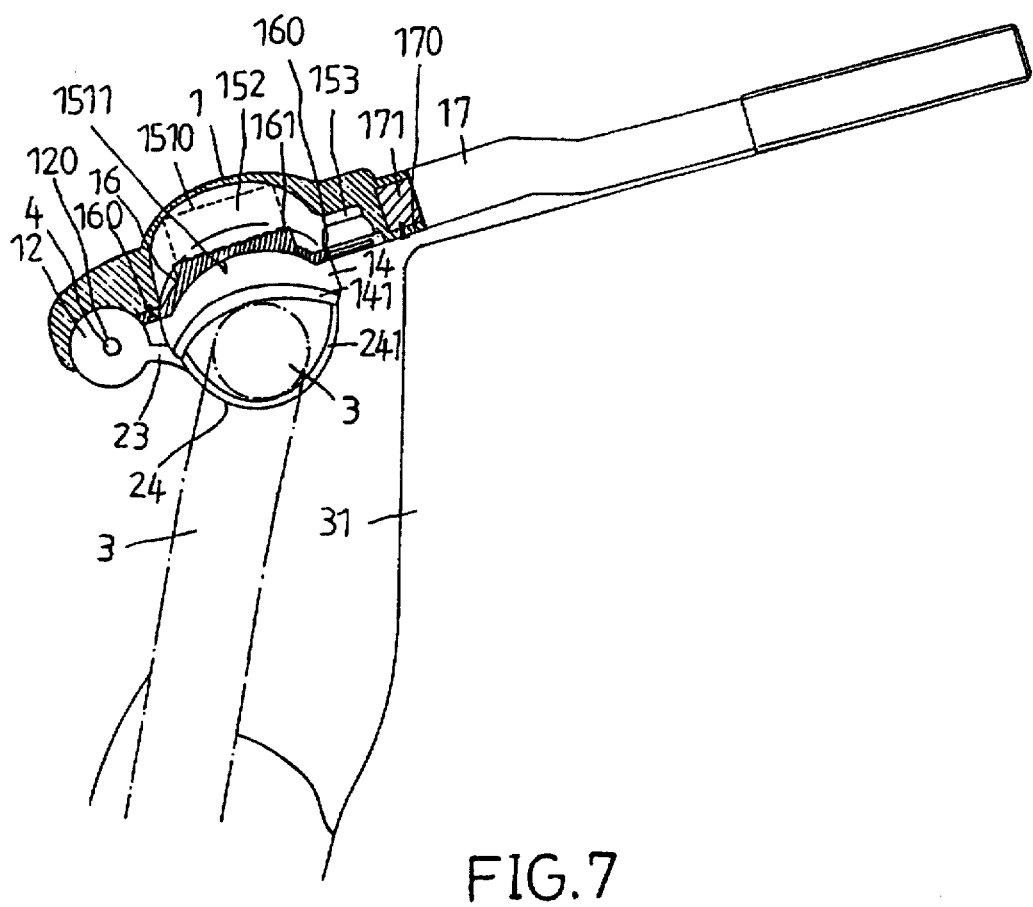
FIG. 7 is an installed view in section of the present invention, showing the casing and the clamping plate fastened to the steering wheel, and the stop bar stopped at the instrument board.
Figure 8:
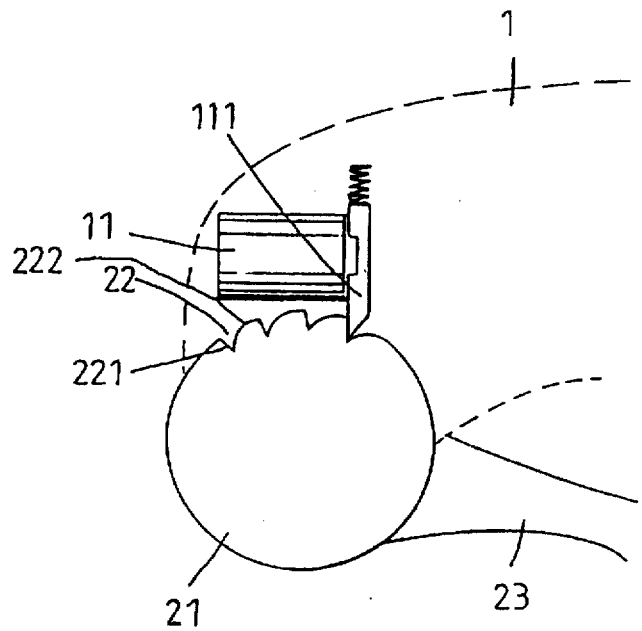
FIG. 8 is a schematic drawing showing an engagement between the lock bolt of the lock cylinder and the teeth of the coupling block of the clamping plate according to the present invention; and, FIG. 9 is a schematic drawing showing another engagement between the lock bolt of the lock cylinder and the teeth of the coupling block of the clamping plate according to the present invention.
Figure 9:
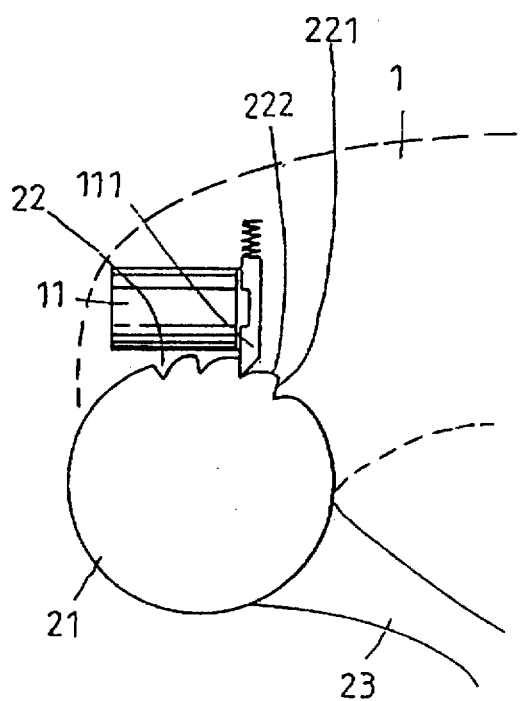

Referring to FIGS. from 5 to 9, a steering wheel lock in accordance with the present invention is generally comprised of a casing 1, and a clamping plate 2 pivotably connected to the casing 1 by a pivot 4. The casing 1 has a car-like shape, a lock cylinder 11 at the center of the rear side, two wheel-like circular coupling blocks 12 having a pivot hole 120 bilaterally disposed at the rear side and spaced from each other by a space 13, two arched wing plates 14 disposed at two opposite sides and adapted for covering over the periphery of the steering wheel 3 at the top, and a mounting hole 170 at the front side. The aforesaid arched wing plates 14 each has a sloping flange 141 at an outer end fitting over the periphery of the steering wheel 3. A stop bar 17 is provided having a coupling rod 171 at one end fixedly mounted in the mounting hole 170 of the casing 1, and adapted for stopping against the instrument board 31. A partition plate 16 is mounted inside the casing 1 to hold an alarm circuit assembly 15. The partition plate 16 is a substantially arched profile, a platform 161 at the top, which holds the alarm circuit assembly 15, a flat front extension board 162, a speaker mounting hole 163 at the center of the front extension board 162, and two rear tabs 164 bilaterally extended from the rear end remote from the front extension board 152. Through holes 1640 and 1620 are respectively made on the rear tabs 164 and the front extension board 162. Through the through holes 1620 and 1640, the partition plate 16 is fixed to the inside of the casing 1 by screws 160. The alarm circuit assembly 15 comprises a battery box 1510 fastened to the platform 161 of the partition plate 16, a battery 152 mounted in the battery box 1510, an alarm control circuit 151 fastened to the battery box 1510 at one side and having a switch lever 1511 inserted through the partition plate 16, and a speaker 153 mounted in the speaker mounting hole 163 of the partition plate 16 and connected to the alarm control circuit 151 by an electric wire. The clamping plate 2 comprises an elongated, smoothly curved clamping section 24 adapted for covering over the periphery of the steering wheel 3 at the bottom, a flat rib 23 raised from the clamping section 24 at one side in the middle, and a circular coupling block 21 connected to the flat rib 23. The circular coupling block 21 is inserted into the space 13 between the wheel-like coupling blocks 12 of the casing 1 and coupled to the pivot 4, having an axial center through hole 210, which receives the pivot 4, and a plurality of transverse teeth 22 raised around the periphery for the engagement of the lock bolt 111 of the lock cylinder 11. The transverse teeth 22 each has a straight, vertical front side 221, and a smoothly curved rear sloping side 222. The clamping section 24 of the clamping plate 2 has two sloping flanges 241 at two opposite ends fitting over the periphery of the steering wheel 3. The sloping flanges 241 each has two upward end edges 242 respectively curved inwards. When the steering wheel lock is installed, the switch lever 1511 is pressed against the periphery of the steering wheel 3, causing the alarm control circuit 151 to be alerted. If the steering wheel lock is destroyed by violence, and the switching lever 1511 is released from the periphery of the steering wheel 3, the alarm control circuit 151 immediately drives the speaker 153 to produce an audio alarm signal.

I claim:

1. A steering wheel lock comprising a casing having a front side and a rear side and a lock cylinder at the rear side, a stop bar having a coupling rod at one end fastened to the front side of said casing and adapted for stopping at an instrument board of a motor vehicle, a clamping plate coupled to the casing and locked by said lock cylinder to secure said casing to a steering wheel, a partition plate mounted inside said casing, and an alarm circuit assembly mounted on said partition plate inside said casing, wherein:

said casing comprises two wheel-like circular coupling blocks bilaterally disposed at the rear side and spaced from each other by a space, two arched wing plates disposed at two opposite lateral sides and adapted for covering over the periphery of the steering wheel, and a mounting hole at the front side, which receives the coupling rod of said stop bar, said arched wing plates each having a sloping flange at an outer end for fitting over the periphery of the steering wheel;

said partition plate comprises a top platform which holds said alarm circuit assembly, a flat front extension board and two rear tabs respectively fastened to said casing on the inside by respective screws, and a speaker mounting hole at said front extension board;

said alarm circuit assembly comprises a battery box fastened to the platform of said partition plate, a battery mounted in said battery box, an alarm control circuit fastened to said battery box at one side and having a switch lever inserted through said partition plate and adapted for pressing on the steering wheel to alert said alarm circuit assembly, and a speaker mounted in said speaker mounting hole and connected to said alarm control circuit by an electric wire;

said clamping plate comprises an elongated, smoothly curved clamping section adapted for covering over the periphery of the steering wheel at the bottom, a flat rib raised from one side of said clamping section in the middle, and a circular coupling block connected to said flat rib and inserted into the space of said casing and pivotably connected between the two circular coupling blocks of said casing by a pivot, the circular coupling block of said clamping plate having a plurality of transverse teeth raised around the periphery for the engagement of a lock bolt of said lock cylinder, the clamping section of said clamping plate having two sloping flanges at two opposite ends for fitting over the periphery of the steering wheel.

* * * * *